Figure 1:
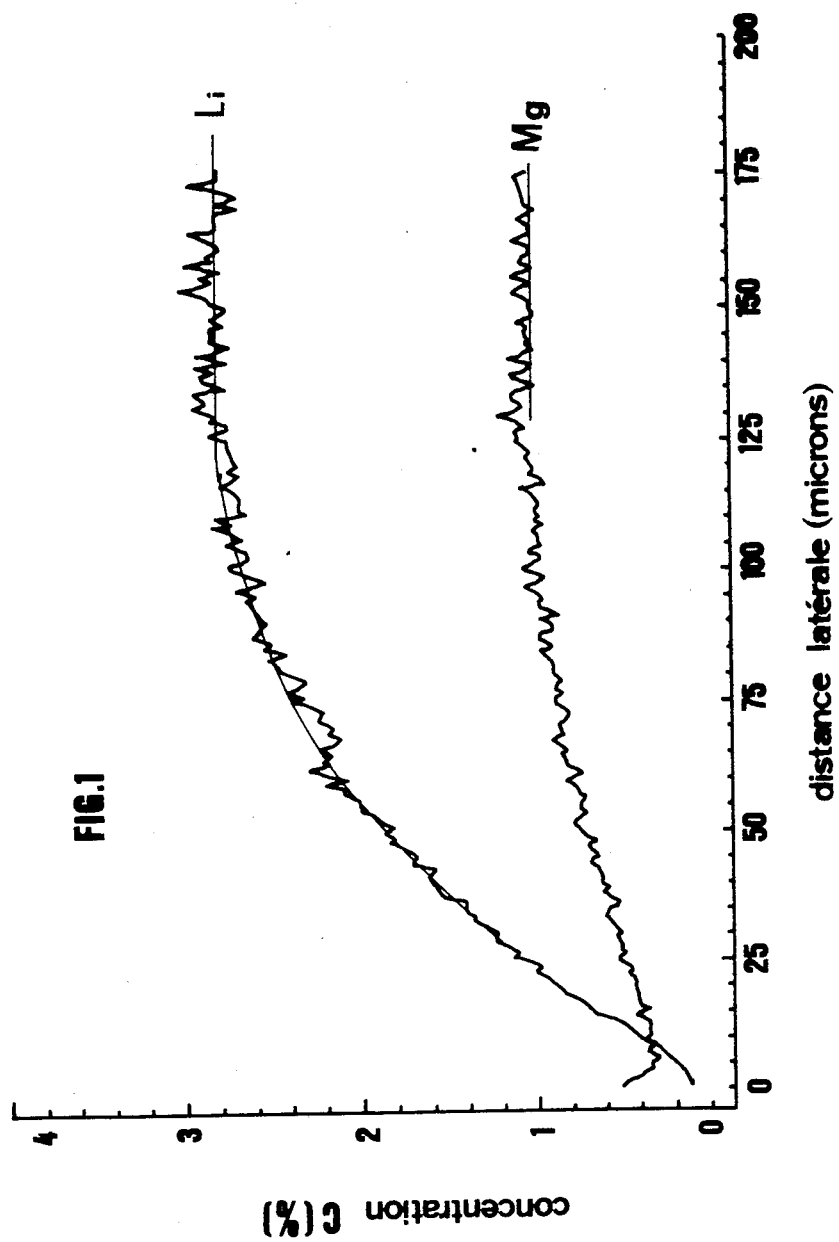

United States Patent [19]

Meyer

[11] Patent Number: 4,717,068
[45] Date of Patent: Jan. 5, 1988

[54] PROCESS FOR PLATING AL ALLOYS CONTAINING LI, BY HOT CO-ROLLING

[75] Inventor: Philippe Meyer, Voiron, France

[73] Assignee: Cegedur Societe de Transformation, Paris, France

[21] Appl. No.: 15,629

[22] Filed: Feb. 17, 1987

[30] Foreign Application Priority Data

Feb. 19, 1986 [FR] France .................. 86 02764

[51] Int. Cl.$^4$ ........................................... B23K 20/24
[52] U.S. Cl. .................... 228/203; 228/235; 228/263.17
[58] Field of Search ............ 228/235, 263.17, 211, 228/203; 164/101

[56] References Cited

U.S. PATENT DOCUMENTS

| | | | |
|---|---|---|---|
| 3,963,468 | 6/1976 | Jaeger et al. | 65/3.11 |
| 4,166,292 | 9/1979 | Bokros. | |
| 4,172,181 | 10/1979 | Kawase et al. | 428/654 |
| 4,172,923 | 10/1979 | Kawase et al. | 428/654 |
| 4,635,842 | 1/1987 | Mohondro | 228/235 |

FOREIGN PATENT DOCUMENTS

| | | |
|---|---|---|
| 2856914 | 7/1980 | France . |
| 2011809 | 7/1979 | United Kingdom . |

Primary Examiner—Nicholas P. Godici
Assistant Examiner—Samuel M. Heinrich
Attorney, Agent, or Firm—Dennison, Meserole, Pollack & Scheiner

[57] ABSTRACT

The invention is directed to a process for plating Al alloys containing lithium by hot co-rolling under the usual heating conditions, in the air. The process comprises effecting controlled oxidation of the core alloy by heating in the air at between 450° C. and 550° C. for a period of time such that the depth affected by the surface loss of Li is between 50 and 700 μm. The core is then treated mechanically or chemically to remove the surface oxides with a loss of alloy less than 30 μm. An assembly of the core and platings is then co-rolled with reheating to a temperature of less than 500° C. for less than 24 hours. The result is perfect adhesion of the core to the surface platings.

10 Claims, 3 Drawing Figures

PROCESS FOR PLATING AL ALLOYS CONTAINING LI, BY HOT CO-ROLLING

The present invention concerns a process for plating Al alloys containing lithium, by hot co-rolling under the usual heating conditions (that is to say in the air).

It is known that using plated Al alloys, particularly in the aeronautical industry, affords the double advantage of improving the surface condition and galvanic pretection of the alloy forming the core, by the metal or alloy forming the surface layer or layers of plating.

Thus, the alloys of series 2000 or 7000 (using the Aluminium Association nomenclature) are currently plated for example using commercially pure aluminium of type A5 or AZ1 (1050 A and 7072 respectively).

However, those plated products must enjoy a very high level of adhesion between the core materials and the surface plating layers in order to ensure that the structure has a good level of mechanical strength.

Now, tests in respect of plating by hot co-rolling of a core consisting of Al alloy containing Li and plating layers (referred to herein as cover layers or sheaths), in particular consisting of 1050 A and 7072, exhibit failures due to non-adhesion of the plating layer or layers to the core material.

That phenomenon is probably due to the fact that, in the heating operation prior to co-rolling, surface oxidation of the core occurs, with the formation of $Li_2O$ which undergoes hydration to form lithia $Li(OH)$ and reacts with carbon dioxide in the atmosphere in the furnace to form the carbonate $Li_2CO_3$.

All those oxidation products prevent a metallurgical bond between the core and the sheath or sheaths in the hot co-rolling operation.

It would admittedly be possible either to reheat the core-sheath assembly in a dry non-oxidizing atmosphere and even under vacuum, but that involves highly specialized equipment and delicate control in respect of the atmospheres in the furnaces, or alternatively it would be possible to weld the sheath or sheaths continuously to the core prior to the annealing operation, in order to prevent interstitial oxidation; however, such procedures are complicated and burdensome.

The applicants solved the problem of plating a Li-containing Al alloy with commercially pure aluminium or an Al alloy which is free from Li, using conventional heating equipment (air furnaces), by introducing into the production line a step for the controlled oxidation of the core alloy in question and elimination of the oxidation products produced, prior to the operation of reheating the core+sheath assembly for the co-rolling operation.

More precisely, oxidation of the product to be plated is effected on a machined surface, for example after a scalping or surface skimming operation, by heating in an air furnace or in any other oxidizing atmosphere, in a range of temperatures To such that:

$$450° C. \leq To \leq 550° C.$$

preferably with $500 \leq To \leq 530°$ C. and for a period of time 'to' such that the depth affected by the surface loss of Li is between 30 and 700 $\mu m$ and preferably 100 and 500 $\mu m$ and particularly between 200 and 500 $\mu m$ (see Example 1 for a method for determining that depth). The period of time 'to' may be easily ascertained experimentally.

The upper limits are based on the fact that the oxidation treatment must not be excessively long in order to retain a good level of productivity; the lower limits are necessary in order to achieve a surface with a sufficiently reduced Li content to provide a good plating effect.

The oxidation operation is followed by an operation for elimination of the surface oxidation products by any per se known chemical or mechanical means such as brushing, shot blasting, sand blasting, pickling, etc. The loss of alloy is to be less than 30 $\mu m$ per face and preferably 10 $\mu m$ per face.

The conditions under which the oxidation products are eliminated may be easily determined experimentally, by means of very simple tests (weight losses). If the depth of attack exceeds 30 $\mu m$, there is no longer any reliable guarantee that the plating will adhere to the alloy.

Reheating of the assembly consisting of the core and the sheath or sheaths prior to the hot co-rolling operation can then be carried out under the usual heating conditions before rolling, with which the man skilled in the art is familiar, in regard to the alloys in question. However, in order to produce a plating which is highly adherent, it is preferable for the reheating temperature not to exceed 500° C. and preferably to be below 470° C. (and even 450° C.), and for the reheating time not to be greater than 24 hours and preferably less than 12 hours. Such conditions make it possible to avoid excessive interstitial oxidation of the assembly through the end face and thus afford a gain in productivity (less end and edge cropping).

Figure 2:
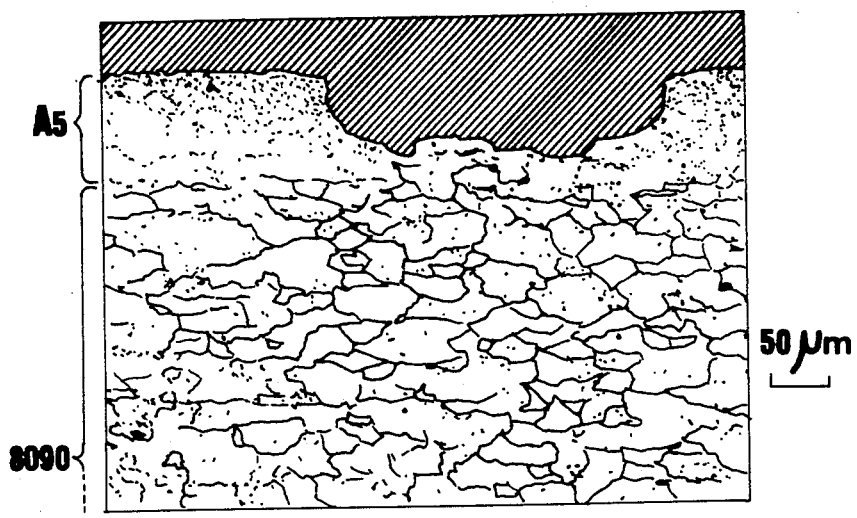
Figure 3:
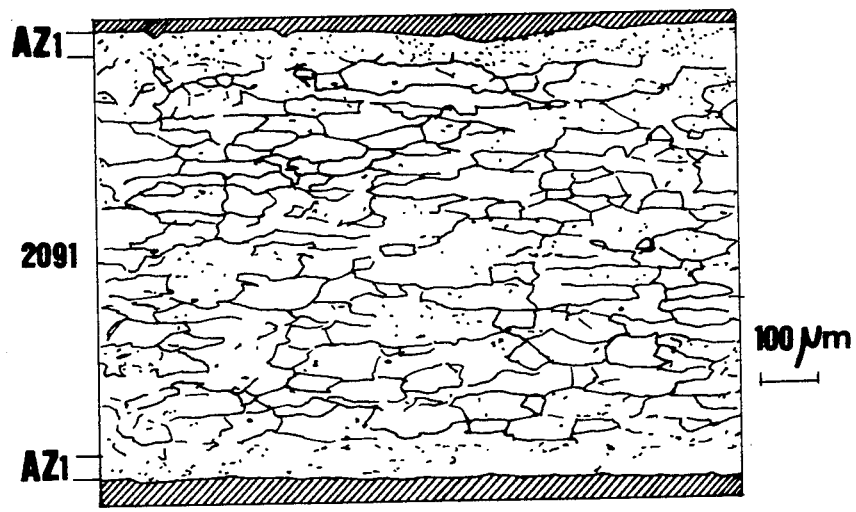

The invention will be better appreciated by reference to the following Examples illustrated in FIGS. 1 to 3.

FIG. 1 shows the profile in respect of the contents of Li and Mg of a core alloy in relation to the distance to the surface after oxidation for 1 hour 30 minutes at a temperature of 535° C., FIG. 2 shows a micrographic section in a long/short transverse plane of an alloy 8090, plated with A5, which is quenched and annealed, in the form of a sheet 1.6 mm in thickness, after 1000 hours in a saline mist (Example 2), and FIG. 3 shows a micrographic section in a long/short transverse plane of an alloy 2091, plated with 7072, which is quenched and annealed, in the form of a 0.8 mm sheet, after 1000 hours in a saline mist (Example 3).

EXAMPLE 1

Determining the depth affected by oxidation

An alloy 8090 which is cast in a plate measuring $800 \times 300$ $mm^2$ in section, of the following composition (in % by weight): 2.8% Li; 1.35% Cu; 1.0% Mg; 0.12% Zr; 0.06% Fe and 0.03% Si, is homogenized for 24 hours at 535° C., scalped or surface skimmed at 15 mm/face, reheated for 24 hours at 470° C. and hot rolled to a thickness of 13 mm. A sample is taken, machined to 1 mm, subjected to solution treatment for 1 hour 30 minutes at a temperature of 535° C. in an air furnace. A polished section is taken perpendicularly to the oxidized surface and using SIMS (Secondary Ionic Mass Spectrography) the contents of lithium and magnesium are measured in relation to the distance with respect to the surface. The result in shown in FIG. 1; it will be noted that there is a reduction in the amount of Li over about 120 $\mu m$.

EXAMPLE 2

An alloy 8090 of the following composition (in % by weight): 2.6% Li; 1.2% Cu; 1.1% Mg; 0.08% Zr; 0.06% Fe and 0.02% Si, with the balance being aluminium, is cast in the form of a plate weighing 150 kg, measuring 350×150 mm² in section, homogenized for 24 hours at 540° C., surface trimmed at 15 mm per face, oxidized for 12 hours at a temperature of 535° C. in an air furnace, immersed in a bath of cold nitric acid (50% by volume of 36° B acid) for 6 minutes, rinsed with water and immersed in a sodium hydroxide bath: concentration 50 g/liter; temperature: 45° C., for 4 minutes (depth of attack 14 μm), rinsed with water, neutralized for 15 minutes in a cold bath of nitric acid containing 50% by volume of 36° B acid, and rinsed with water.

Two sheathing layers, each measuring 6 mm in thickness, of A5, are then deposited on the plate, one to each large face, and held in position by fixing to one end of the plate of alloy 8090. The assembly is heated for 12 hours at a temperature of 450° C. and then hot rolled to 3.2 mm, annealed for 1 hour 30 minutes at 400° C., cold rolled to 1.6 mm, subjected to solution treatment for 15 minutes at 540° C., quenched with cold water, stretched by 2% and tempered for 6 hours at 170° C.

The sheet when tempered in that way is exposed for 1000 hours to a saline mist (standard ASTM B117). The plating has infrequent pits; they stop at the aluminium-lithium contact, as shown in FIG. 2. The high quality of the core-plating bond will also be noted.

EXAMPLE 3

An alloy 2091 of the following composition (in % by weight): 2.0% Li; 2.1% Cu; 1.45% Mg; 0.07% Zr; 0.05% Fe; and 0.03% Si, is cast in a plate weighing 1500 kg and measuring 800×300 mm² in section, homogenized for 24 hours at 520° C., trimmed at both ends, scalped or surface trimmed by 15 mm per face, oxidized for 24 hours at a temperature of 520° C. in an air furnace, with the plate vertical, cooled in stationary air, immersed in a bath of cold nitric acid (50% by volume of 36° B acid) for 5 minutes, rinsed with water, immersed in a bath of sodium hydroxide at a concentration of 75 g/l at a temperature of 40° C. for 3 minutes (depth of attack 8 μm), rinsed with water, neutralized for 10 minutes in a bath of cold nitric acid (50% by volume of 36° B acid) and finally rinsed with cold water.

Two sheaths of alloy 7072 using the Aluminium Association designation are deposited on the plate (one per each large face), and held in position by fixing to an end of the plate of alloy 2091. The thickness of the alloy 7072 is 20 mm per sheath. The assembly is heated for 12 hours at 470° C. in an air furnace and then hot rolled to 3.6 mm, wound in a coil, annealed for 24 hours at 430° C. and continuously cold rolled to 1.2 mm.

A portion of the sheets is rolled again as sheet to sheet to a thickness of 0.8 mm.

The thin sheets are then subjected to solution treatment for 15 minutes at 530° C., quenched with cold water and tempered for 24 hours at 170° C. The absence of blisters and detachment after the quenching operation, over a small thickness, confirms the good mechanical quality of the plating.

The thin sheets when exposed for 1000 hours to a saline mist (standard ASTM B-117) show a good resistance to corrosion (see FIG. 3), with effective galvanic protection.

The process according to the invention is applied to all Al alloys containing Li, in particular alloys containing (in % by weight):

Li: 0.3 to 4%
Cu: 0 to 5%
Mg: 0 to 7%
Zn: 0 to 15%
Zr: 0 to 0.2%
Mn: 0 to 1.0%
Cr: 0 to 0.3%
Nb: 0 to 0.2%
Ni: 0 to 0.5%
Fe: 0 to 0.5%
Si: 0 to 0.5%
Other elements: ≦0.05%
Balance Al, with preferably:

$$\%Zn/30 + \%Mg/18 + \%Li/4.2 + \%Cu/7 \leq 1$$

in order to achieve an acceptable level of hot deformability.

What is claimed is:

1. In a process for plating by hot co-rolling of a core Al alloy containing Li with a sheath of commercially pure Al or an Al alloy which is free of Li, by reheating and hot co-rolling the core and sheath, the improvement comprising, prior to reheating, subjecting the core alloy to an oxidation operation at a temperature of between 450° C. and 550° C., such that the Li content is reduced in a zone having a depth of between 50 and 700 μm, and chemically and/or mechanically treating the core alloy so as to eliminate the products of the oxidation operation, with a surface loss of alloy in the course of said chemical and/or mechanical treatment of at most 30 μm.

2. A process according to claim 1 characterised in that the oxidation operation takes place at between 500° and 530° C.

3. A process according to claim 1 or claim 2 characterised in that in the course of the chemical or mechanical treatment the depth of alloy removed is less than 10 μm.

4. A process according to claim 1 or claim 2 characterised in that the depth of the zone in which the Li content is reduced is between 100 and 500 μm.

5. A process according to claim 4 characterised in that the depth of the zone in which the Li content is reduced is between 200 and 500 μm.

6. A process according to claim 1 or claim 2 characterised in that the reheating operation prior to co-rolling is effected at a temperature which does not exceed 500° C. and for a period which does not exceed 24 hours.

7. A process according to claim 6 characterised in that the reheating operation is effected at a temperature of less than 470° C. for a period of less than 12 hours.

8. A process according to claim 7, wherein the reheating operation is effected at a temperature of less than 450° C.

9. A process according to claim 1 or claim 2, wherein the Al alloy containing Li contains, in percent by weight: 0.3 to 4 Li; 0 to 5 Cu; 0 to 7 Mg; 0 to 15 Zn; 0 to 0.2 Zr; 0 to 1.0 Mn; 0 to 0.3 Cr; 0 to 0.2 Nb; 0 to 0.5 Ni; 0 to 0.5 Fe; 0 to 0.5 Si; ≦0.05 each, other elements; and the balance Al.

10. A process according to claim 9, wherein $$\%Zn/30 + \%Mg/18 + \%Li/4.2 + \%Cu/7 \leq 1.$$

* * * * *